(12) United States Patent
Chen et al.

(10) Patent No.: US 10,650,204 B2
(45) Date of Patent: May 12, 2020

(54) BARCODE DETECTION METHOD AND BARCODE DETECTION SYSTEM FOR INCREASING DETECTION EFFICIENCY BY USING GRAY LEVEL FLIP COUNTS

(71) Applicant: WELTREND SEMICONDUCTOR INC., Hsinchu (TW)

(72) Inventors: Hsuan-Ying Chen, Hsinchu (TW); Hung-Chih Chiang, Hsinchu (TW); Ian Hsu, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 143 days.

(21) Appl. No.: 16/103,877

(22) Filed: Aug. 14, 2018

(65) Prior Publication Data

US 2019/0377918 A1 Dec. 12, 2019

(30) Foreign Application Priority Data

Jun. 6, 2018 (TW) ................ 107119409 A (51) Int. Cl.
*G06K 7/10* (2006.01)
*G06K 15/12* (2006.01)
(Continued)

(52) U.S. Cl.
CPC ....... *G06K 7/10722* (2013.01); *G06K 7/1413* (2013.01); *G06K 7/1452* (2013.01); *G06T 7/13* (2017.01); *G06T 7/90* (2017.01)

(58) Field of Classification Search
CPC .. G06K 19/06168; G06K 9/58; G06K 7/1421; G06K 19/06009
See application file for complete search history.

(56) References Cited

U.S. PATENT DOCUMENTS 5,459,492 A * 10/1995 Venkateswar ...... G06K 15/1238
347/253
6,504,948 B1 * 1/2003 Schemmel ............. G06T 7/001
382/149
(Continued)

FOREIGN PATENT DOCUMENTS

CN 105989317 A 10/2016
TW I286706 9/2007
(Continued)

*Primary Examiner* — Thien T Mai
(74) *Attorney, Agent, or Firm* — Winston Hsu (57) ABSTRACT

A barcode detection method includes acquiring an image by a camera, acquiring a horizontal gradient and a vertical gradient of each pixel of the image within a region, generating a gradient phase and gradient magnitude of each pixel according to the horizontal gradient and the vertical gradient, performing a binarization process to the gradient magnitude of each pixel of the image within the region for generating a binarized image, vertically and horizontally sampling the binarized image for generating the gray level flip count in a vertical direction and a horizontal direction, locating an image region of a barcode according to the gray level flip count in the vertical direction and the horizontal direction, acquiring a plurality of gradient phases of all pixels within the image region for generating a gradient phase distribution, and generating a barcode format detection result according to the gradient phase distribution.

10 Claims, 10 Drawing Sheets

(51) Int. Cl.
*G06T 7/90* (2017.01)
*G06K 7/14* (2006.01)
*G06T 7/13* (2017.01)

(56) References Cited

U.S. PATENT DOCUMENTS

| | | | |
|---|---|---|---|
| 8,763,908 | B1 | 7/2014 | Feldman |
| 9,378,404 | B2 | 6/2016 | Rowe |
| 9,396,422 | B1 | 7/2016 | Benni |
| 2005/0046741 | A1* | 3/2005 | Wu .................. H04N 7/01 348/452 |
| 2007/0086653 | A1* | 4/2007 | Javidi .............. G06K 19/06168 382/181 |
| 2011/0234930 | A1* | 9/2011 | Nishida ............. G09G 3/3655 349/33 |
| 2018/0144179 | A1* | 5/2018 | Hatakeyama ........ G06K 9/0061 |
| 2019/0109973 | A1* | 4/2019 | Riza ................... H04N 5/2258 |

FOREIGN PATENT DOCUMENTS

| | | |
|---|---|---|
| TW | 201025152 A1 | 7/2010 |
| TW | 201113815 A1 | 4/2011 |

\* cited by examiner

BARCODE DETECTION METHOD AND BARCODE DETECTION SYSTEM FOR INCREASING DETECTION EFFICIENCY BY USING GRAY LEVEL FLIP COUNTS

BACKGROUND OF THE INVENTION

1. Field of the Invention

The present invention illustrates a barcode detection method and a barcode detection system, and more particularly, the barcode detection method and the barcode detection system for increasing detection efficiency by using gray level flip counts.

2. Description of the Prior Art

With advancements of technologies, various barcodes are gradually adopted in our daily life. Actually, complicated and error-prone text messages are gradually being replaced with the barcodes. Particularly, the barcode can be regarded as an image pattern recognition element set in form of several black bars and white spaces with different widths according to a certain coding rule (i.e., ratios of black and white widths) for bearing some useful information. A common barcode is formed by an image pattern including parallel black bars and white spaces for achieving high reflectivity. The barcode can indicate a country which manufactures a product, a manufacturer of the product, a name of the product, a date the product being manufactured, a classification number of a book, starting and ending locations, any type of messages, or a certain date. Thus, barcodes are available in many fields of applications such as a commodity circulation, a library management, a postal management, and a banking system.

In general, two processes are required to identify the barcode for generating (or say, extracting) meaningful information. The first process is called as a barcode sampling process. The barcode sampling process can use an optical component such as a camera, a scanner, or a laser recognition device for capturing a barcode image. The second process is called as a decoding process. The decoding process can use a lookup table or a decoder for acquiring the meaningful information from the sampled barcode. Generally, before the decoding process is performed, presence of the barcode and a format of the barcode (i.e., a one-dimensional barcode format or a two-dimensional barcode format) are required to be detected first. However, in the image captured by the camera, the presence of the barcode and the format of the barcode can be detected after all pixels of the image are scanned in a row-by-row manner. In other words, when a size or resolution of the image is very high, scanning all pixels of the image for detecting the presence of the barcode and the format of the barcode requires a long processing time. Further, when the barcode detection fails, a pixel scanning process (i.e., the scanning process in the row-by-row manner) has to be executed again. Therefore, such inefficient and time consuming barcode detection method wastes additional system resources.

SUMMARY OF THE INVENTION

In an embodiment of the present invention, a barcode detection method is disclosed. The barcode detection method comprises acquiring an image by a camera, acquiring a horizontal gradient and a vertical gradient of each pixel within a range of the image, generating a gradient phase and a gradient magnitude of the each pixel according to the horizontal gradient and the vertical gradient, performing a binarization process to the gradient magnitude of the each pixel within the range of the image for generating a binarized image, vertically sampling the binarized image by using V vertical scan lines for generating V gray level flip counts of the binarized image in a vertical direction, horizontally sampling the binarized image by using H horizontal scan lines for generating H gray level flip counts of the binarized image in a horizontal direction, locating an image region of a barcode according to the V gray level flip counts in the vertical direction and the H gray level flip counts in the horizontal direction, acquiring a plurality of gradient phases of all pixels within the image region for generating a gradient phase distribution, and generating a barcode format detection result according to the gradient phase distribution. Two adjacent vertical scan lines are separated by N pixels. Two adjacent horizontal scan lines are separated by M pixels. N, M, V and H are four positive integers greater than or equal to one.

In another embodiment of the present invention, a barcode detection system is disclosed. The barcode detection system comprises a camera, a processor, and a memory. The camera is configured to capture an image. The processor is coupled to the camera and configured to process the image in order to generate a barcode format detection result. The memory is coupled to the processor and configured to buffer image processing data. The processor acquires a horizontal gradient and a vertical gradient of each pixel within a range of the image, generates a gradient phase and a gradient magnitude of the each pixel according to the horizontal gradient and the vertical gradient, performs a binarization process to the gradient magnitude of the each pixel within the range of the image for generating a binarized image, vertically samples the binarized image by using V vertical scan lines for generating V gray level flip counts of the binarized image in a vertical direction, saves the V gray level flip counts to the memory, horizontally samples the binarized image by using H horizontal scan lines for generating H gray level flip counts of the binarized image in a horizontal direction, saves the H gray level flip counts to the memory, locates an image region of a barcode according to the V gray level flip counts and the H gray level flip counts saved in the memory, acquires a plurality of gradient phases of all pixels within the image region for generating a gradient phase distribution, and generates the barcode format detection result according to the gradient phase distribution. Two adjacent vertical scan lines are separated by N pixels. Two adjacent horizontal scan lines are separated by M pixels. N, M, V and H are four positive integers greater than or equal to one.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
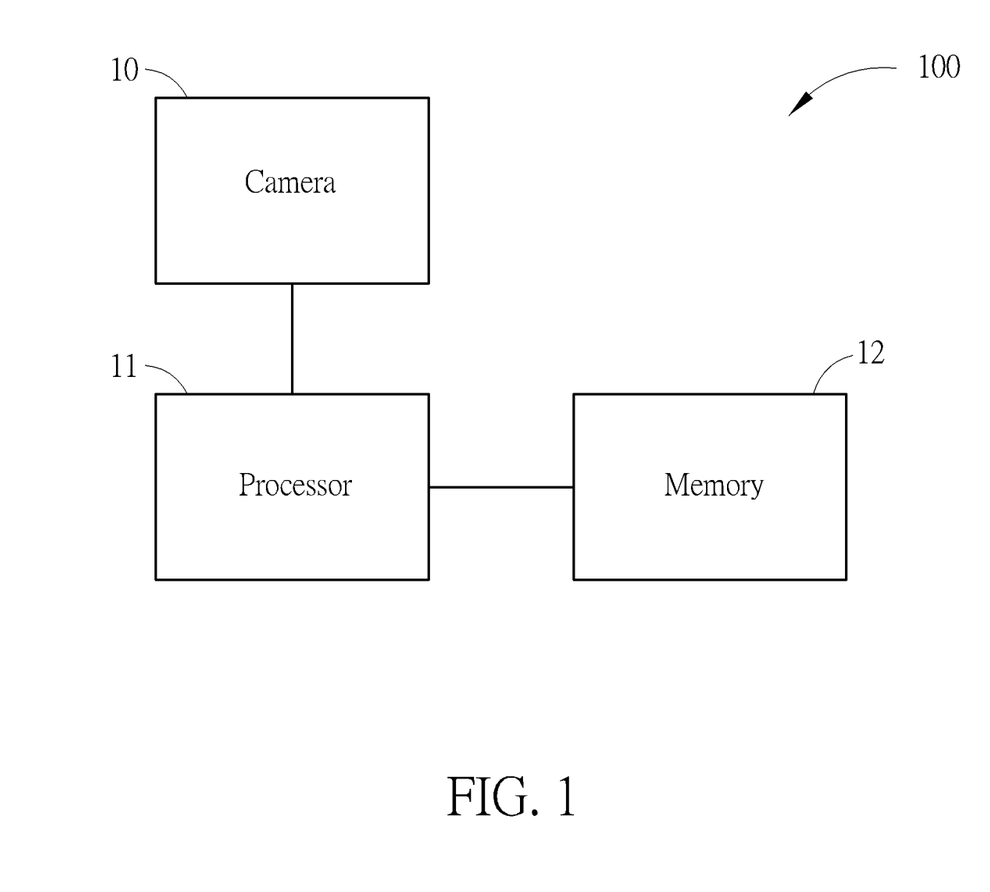
FIG. 1 is a block diagram of a barcode detection system according to an embodiment of the present invention.

FIG. 1 is a block diagram of a barcode detection system 100 according to an embodiment of the present invention. The barcode detection system 100 can be applied to detect one-dimensional barcodes and two-dimensional barcodes. Generally, one-dimensional barcodes have several formats, such as a Universal Product Code (UPC), a European Article Number (EAN) code, an International Standard Book Number (ISBN) code, a Code 39, a Code 93, and a Code 128. Generally, two-dimensional barcodes have several formats, such as a quick response code (QR code), a PDF417 barcode, and a data matrix pattern code. The barcode detection system 100 includes a camera 10, a processor 11, and a memory 12. The camera 10 is used for capturing an image. The camera 10 can include any image capturing device. For example, the camera 10 can include a built-in lens and an optical sensor for capturing an optical signal. Then, the camera 10 can process the optical signal for generating the image. Particularly, the image acquired by the camera 10 can include a barcode image. The processor 11 is coupled to the camera 10 for processing the image in order to generate a barcode format detection result. The processor 11 can be any type of processing device, such as a central processing unit, a microprocessor, a logical operation unit, or a programmable chip. The processor 11 can also determine whether the barcode image can be detected. The memory 12 is coupled to the processor 11 for buffering image processing data. The memory 12 can be any type of data-saving device, such as a hard disk, a random access memory (RAM), or a non-volatile memory. The image processing data saved in the memory 12 can include data of horizontal gradients, vertical gradients, gray level flip counts in a vertical direction, gray level flip counts in a horizontal direction, and a plurality of gradient phase decision boundaries. The image processing data is illustrated later. Steps and principles of a barcode detection method performed by the barcode detection system 100 are also described below.

Figure 2:
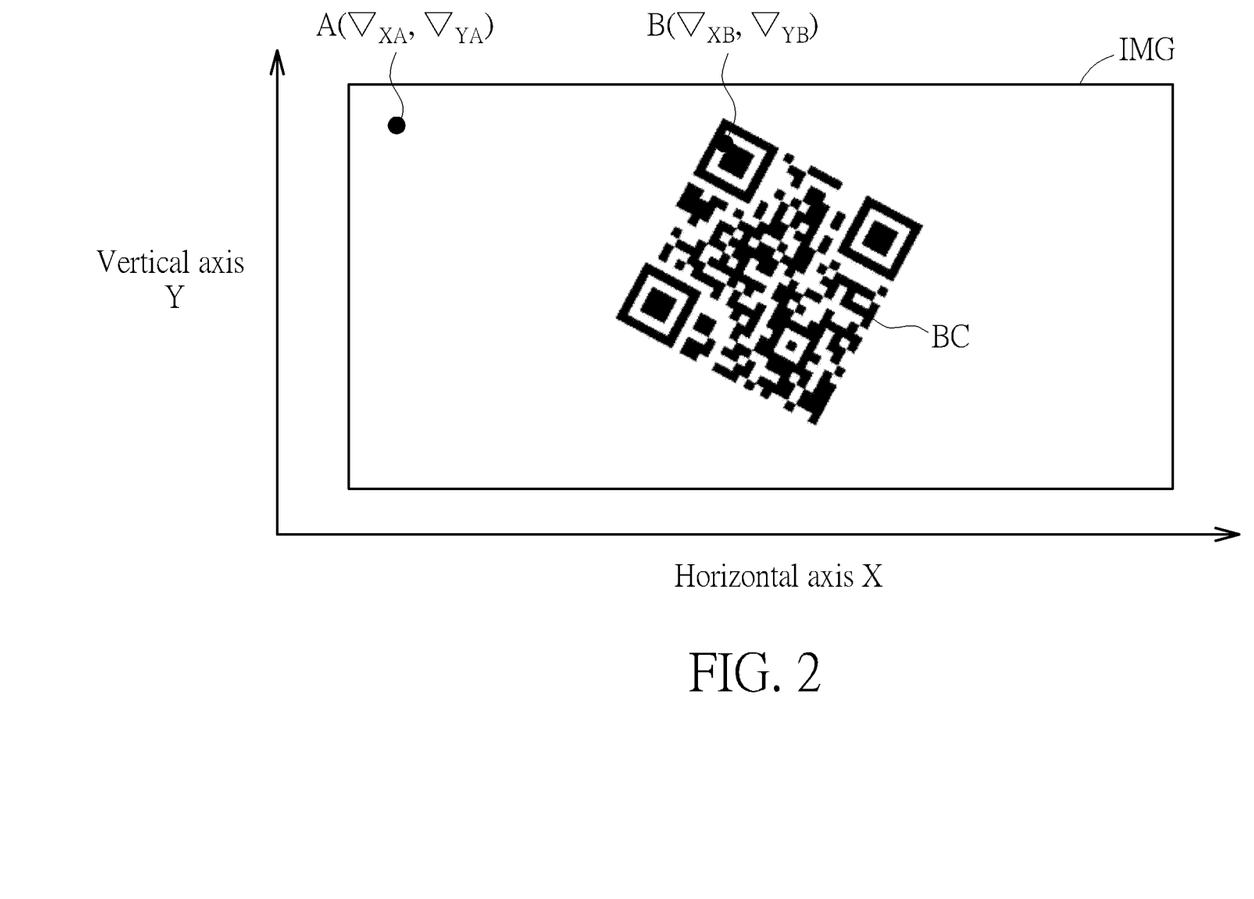
FIG. 2 is an illustration of acquiring a horizontal gradient and a vertical gradient of each pixel within a range of an image of the barcode detection system in FIG. 1.

FIG. 2 is an illustration of acquiring a horizontal gradient and a vertical gradient of each pixel within a range of the image IMG of the barcode detection system 100. As mentioned previously, the camera 10 is capable of capturing the image IMG. Therefore, after the processor 11 receives the image IMG captured by the camera 10, the processor 11 can acquire a horizontal gradient and a vertical gradient of each pixel within the range of the image IMG. For example, the processor 11 can use a Sobel algorithm for acquiring the horizontal gradient and the vertical gradient of the each pixel within the range of the image IMG according to convolution results of a horizontal edge detection filter, a vertical edge detection filter, and brightness of the each pixel within the range of the image IMG. However, the processor 11 can acquire a horizontal gradient and a vertical gradient of each pixel within a "specific" small range of the image IMG for reducing computational complexity. For example, the "specific" small range of the image IMG can be defined as a center region of the image IMG or a cropped region of the image IMG. Any reasonable position or size adjustment of the range of the image IMG falls into the scope of the present invention. For simplicity, the range of the image IMG is defined as a range of full image size hereafter. In the embodiment, the horizontal edge detection filter and the vertical edge detection filter (i.e., invoking the Sobel algorithm) can be performed a linear combination operation with a data vector of the each pixel of the image IMG in order to generate the convolution results. Then, the horizontal gradient and the vertical gradient of the each pixel can be generated accordingly. In FIG. 2, Y axis is denoted as a vertical axis. X axis is denoted as a horizontal axis. Here, a pixel A is located outside a barcode BC so that surrounding colors of the pixel A are invariant. Therefore, a horizontal gradient and a vertical gradient of the pixel A (i.e., denoted as A($\nabla_{XA}$, $\nabla_{YA}$)) are small values. However, a pixel B is located inside the barcode BC so that surrounding colors of the pixel B are varied. Therefore, at least one of a horizontal gradient and a vertical gradient of the pixel B (i.e., denoted as B($\nabla_{XV}$, $\nabla_{YB}$)) is a large value. After the processor 11 acquires all horizontal gradients and vertical gradients of the image IMG, data of all horizontal gradients and vertical gradients can be saved in the memory 12. Then, the processor 11 can generate a gradient phase and a gradient magnitude of the each pixel according to the horizontal gradient and the vertical gradient of the each pixel. For example, when a vertical gradient of a pixel is very large and a horizontal gradient of the pixel is substantially equal to zero, it implies that a gradient phase of the pixel is substantially equal to $\pi/2$. Therefore, surrounding image contours of the pixel are distributed vertically. When a horizontal gradient of a pixel is very large and a vertical gradient of the pixel is substantially equal to zero, it implies that a gradient phase of the pixel is substantially equal to zero. Therefore, surrounding image contours of the pixel are distributed horizontally. Further, the gradient phase and the gradient magnitude of the each pixel can be derived by using a non-linear function with arguments including the horizontal gradient and the vertical gradient. The gradient magnitude is also relevant to gradient. When a pixel has high gradient, it implies that a gradient magnitude of the pixel is large. When a pixel has low gradient, it implies that a gradient magnitude of the pixel is small. The processor 11 can save data of the gradient phases and the gradient magnitudes of all pixels of the image IMG to the memory 12.

Figure 3:
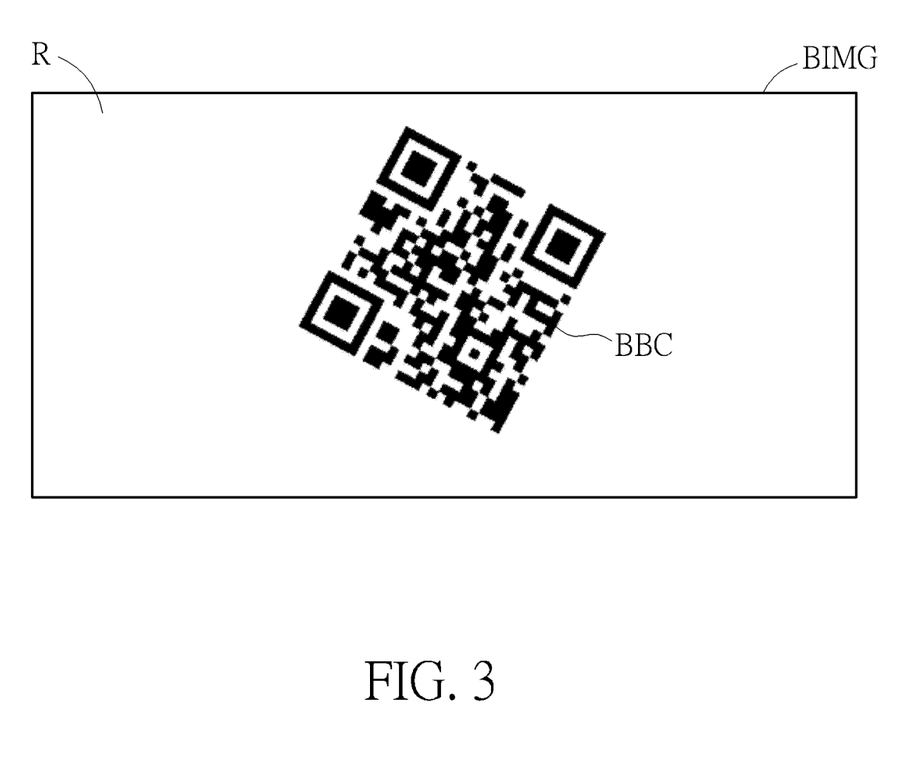
FIG. 3 is an illustration of performing a binarization process to the range of the image of the barcode detection system in FIG. 1.

FIG. 3 is an illustration of performing a binarization process to the range of the image IMG of the barcode detection system 100. As previously mentioned, "the range of the image IMG" can be denoted as the range of full image size for the image IMG. Therefore, an expression of "the range of the image IMG" is simplified as "the image IMG" hereafter. After the processor 11 acquires the gradient phases and gradient magnitudes of all pixels of the image IMG, the processor 11 can compare a threshold value with the gradient magnitude of the each pixel for mapping the gradient magnitude to a first gray level or a second gray level. For example, the processor 11 can set the threshold value before a binarization process is performed. When a gradient magnitude of a pixel is greater than the threshold value, the processor 11 can map the gradient magnitude of the pixel to the first gray level. When a gradient magnitude of a pixel is smaller than the threshold value, the processor 11 can map the gradient magnitude of the pixel to the second gray level. The first gray level can be substantially equal to 255 (i.e., corresponding to white color). The second gray level can be substantially equal to zero (i.e., corresponding to black color). By using the binarization process, the processor 11 can convert the image IMG in FIG. 2 into a binarized image BIMG with only two colors. For example, for the binarized image BIMG in FIG. 3, a binarized barcode BBC has only black and white colors. A region R outside the binarized barcode BBC has only white color. After the binarization process is performed, noise interference or color interference can be reduced, thereby improving barcode detection reliability.

Figure 4:
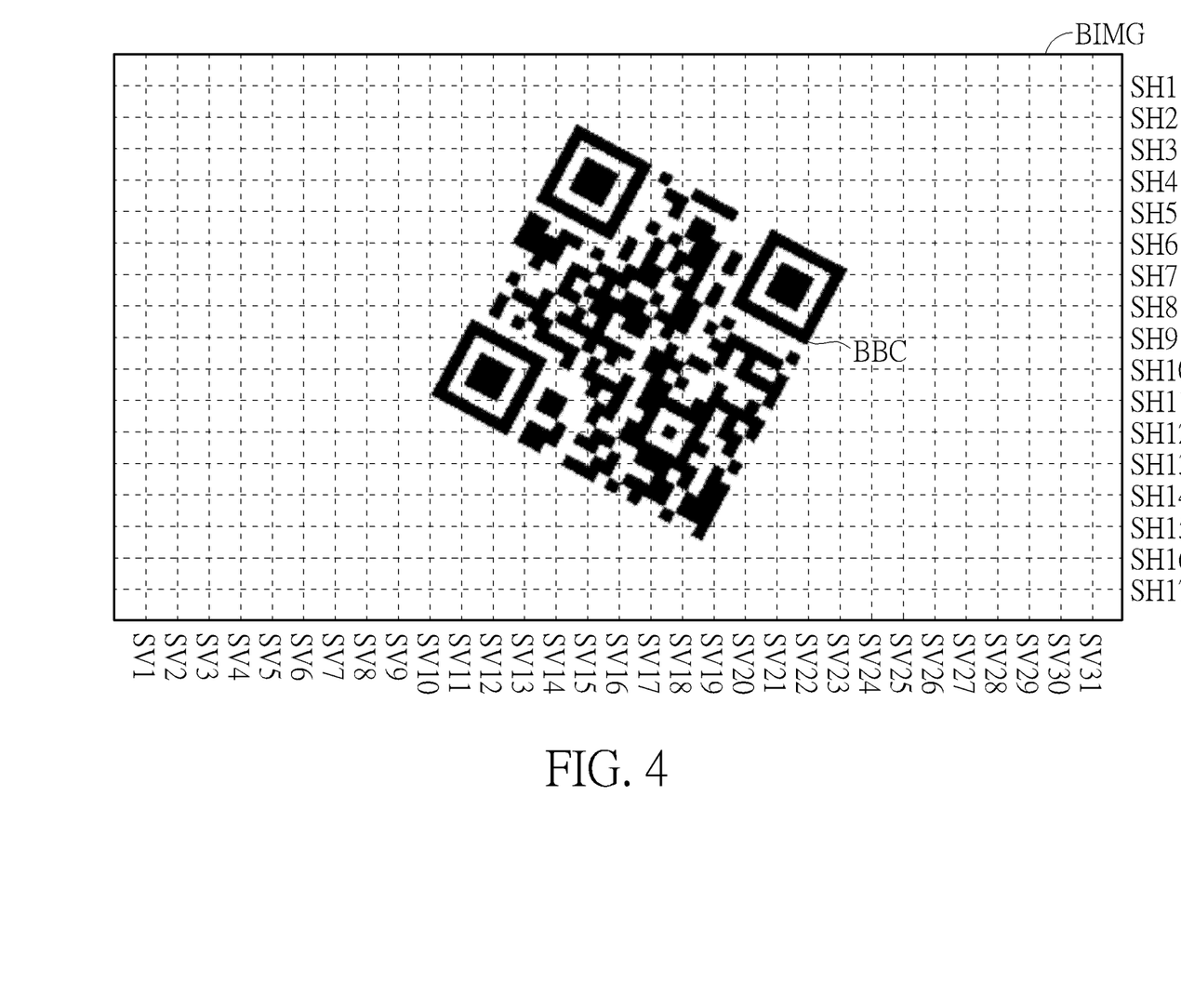
FIG. 4 is an illustration of vertically sampling and horizontally sampling a binarized image of the barcode detection system in FIG. 1.

FIG. 4 is an illustration of vertically sampling and horizontally sampling the binarized image BIMG of the barcode detection system 100. In order to reduce the processing time and computational complexity, the barcode detection system 100 can use an interval-based sampling mechanism in the binarized image BIMG. For example, the barcode detection system 100 can vertically sample the binarized image BIMG by using V vertical scan lines for generating V gray level flip counts of the binarized image BIMG in a vertical direction. Two adjacent vertical scan lines are separated by N pixels. For example, two adjacent vertical scan lines can be separated by 2~4 pixels (i.e., N=2~4). Vertical scan lines SV1 to SV31 (i.e., V=31) can be used for vertically sampling the binarized image BIMG in order to generate 31 gray level flip counts of the binarized image BIMG in the vertical direction. Similarly, the barcode detection system 100 can horizontally sample the binarized image BIMG by using H horizontal scan lines for generating H gray level flip counts of the binarized image BIMG in a horizontal direction. Two adjacent horizontal scan lines are separated by M pixels. For example, two adjacent horizontal scan lines can be separated by 2~4 pixels (i.e., M=2~4). Horizontal scan lines SH1 to SH17 (i.e., H=17) can be used for horizontally sampling the binarized image BIMG in order to generate 17 gray level flip counts of the binarized image BIMG in the horizontal direction. However, the present invention is not limited by using specific N, M, V and H. Generally, N, M, V and H are four positive integers greater than or equal to one. In FIG. 4, since the interval-based sampling mechanism is introduced to the barcode detection system 100, the processing time and computational complexity can be reduced. Further, N, M, V and H can be adjusted based on requirement of detection quality. For example, when high resolution of the detection quality is required, a vertical sampling interval N and a horizontal sampling interval M can be reduced for increasing the number of vertical scan lines (V) and the number of horizontal scan lines (H). Also, the vertical sampling interval N between two adjacent vertical scan lines and the horizontal sampling interval M between two adjacent horizontal scan lines can be dynamically adjusted. For example, a distribution (or say, allocation) of the V vertical scan lines can be optimized by adjusting the vertical sampling interval N as a variable space parameter between two adjacent vertical scan lines. Similarly, a distribution (or say, allocation) of the H horizontal scan lines can be optimized by adjusting the horizontal sampling interval M as a variable space parameter between two adjacent horizontal scan lines. Therefore, by appropriately adjusting N, M, V and H, the barcode detection system 100 can provide high operational flexibility.

Figure 5:
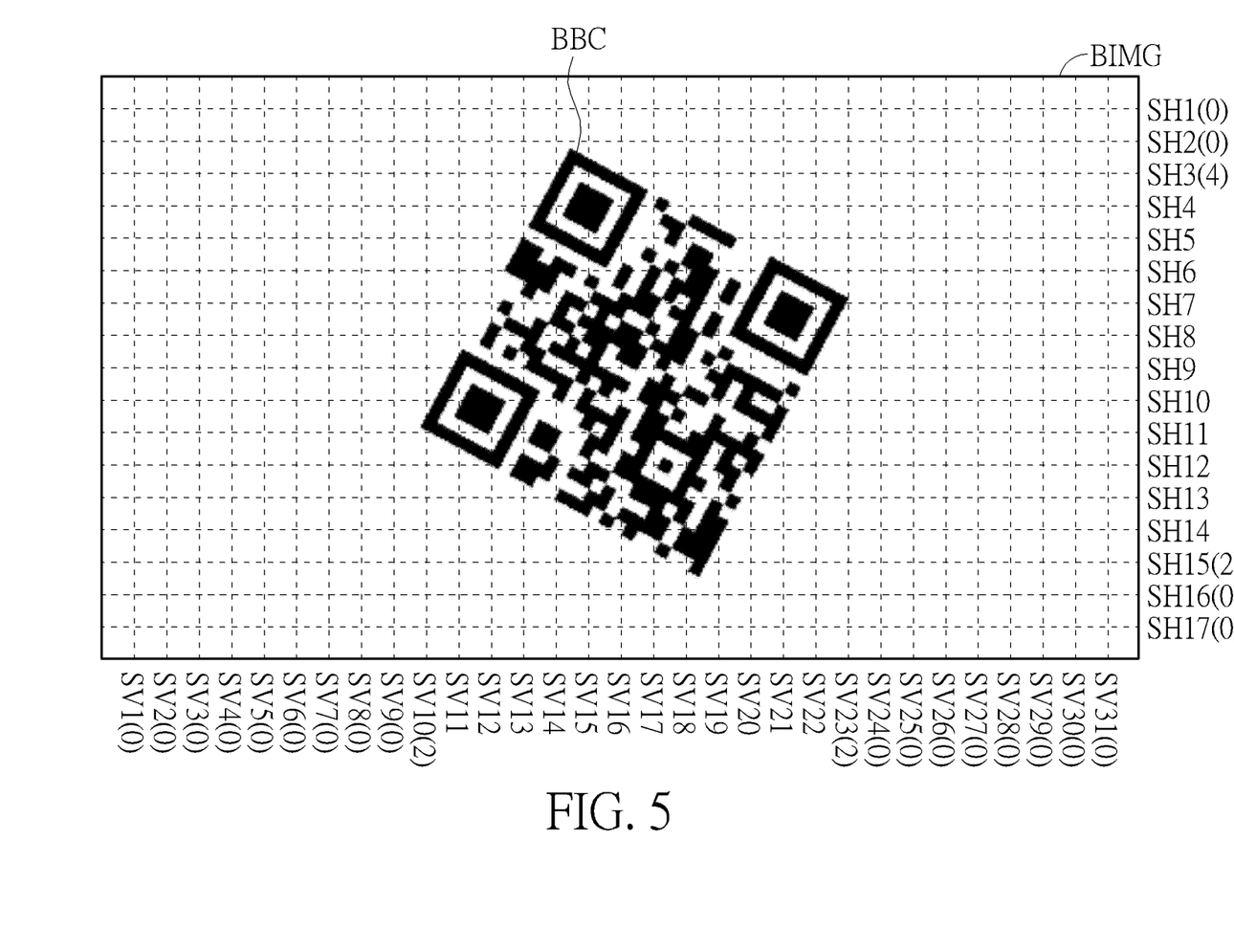
FIG. 5 is an illustration of generating a plurality of gray level flip counts of the binarized image in a vertical direction and a plurality of gray level flip counts of the binarized image in a horizontal direction of the barcode detection system in FIG. 1.

FIG. 5 is an illustration of generating a plurality of gray level flip counts of the binarized image BIMG in the vertical direction and a plurality of gray level flip counts of the binarized image BIMG in the horizontal direction of the barcode detection system 100. As previously mentioned, the binarized image BIMG has only white color with the first gray level and black color with the second gray level. Thus, color data of a column or a row of pixels sampled by a single scan line can include color variations of the column or the row of pixels. For example, since horizontal scan lines SH1, SH2, SH16, and SH17 sample a region outside the binarized barcode BBC, only the first gray value is detected. Since no color variation is introduced, gray level flip counts of the horizontal scan lines SH1, SH2, SH16, and SH17 are equal to zero, which are denoted as SH1(0), SH2(0), SH16(0), and SH17(0). Since horizontal scan lines SH3 and SH15 sample a region inside the binarized barcode BBC, at least two gray level flip counts are detected by the SH3 and SH15, which are denoted as SH3(4) and SH15(2) in FIG.5. Similarly, since vertical scan lines SV1 to SV9 and SV24 to SV31 sample a region outside the binarized barcode BBC, only the first gray value is detected. Since no color variation is introduced, gray level flip counts of the vertical scan lines SV1 to SV9 and SV24 to SV31 are equal to zero, which are denoted as SV1(0) to SV9(0) and SV24(0) to SV31(0). Since vertical scan lines SV10 and SV23 sample a region inside the binarized barcode BBC, at least two gray level flip counts are detected by the SV10 and SV23, which are denoted as SV10(2) and SV23(2) in FIG. 5. Generally, the H gray level flip counts of the binarized image BIMG in the horizontal direction are defined as H gray level flip counts switched between the first gray level and the second gray level in the horizontal direction sampled by the H horizontal scan lines. Similarly, the V gray level flip counts of the binarized image BIMG in the vertical direction are defined as V gray level flip counts switched between the first gray level and the second gray level in the vertical direction sampled by the V vertical scan lines.

Figure 6:
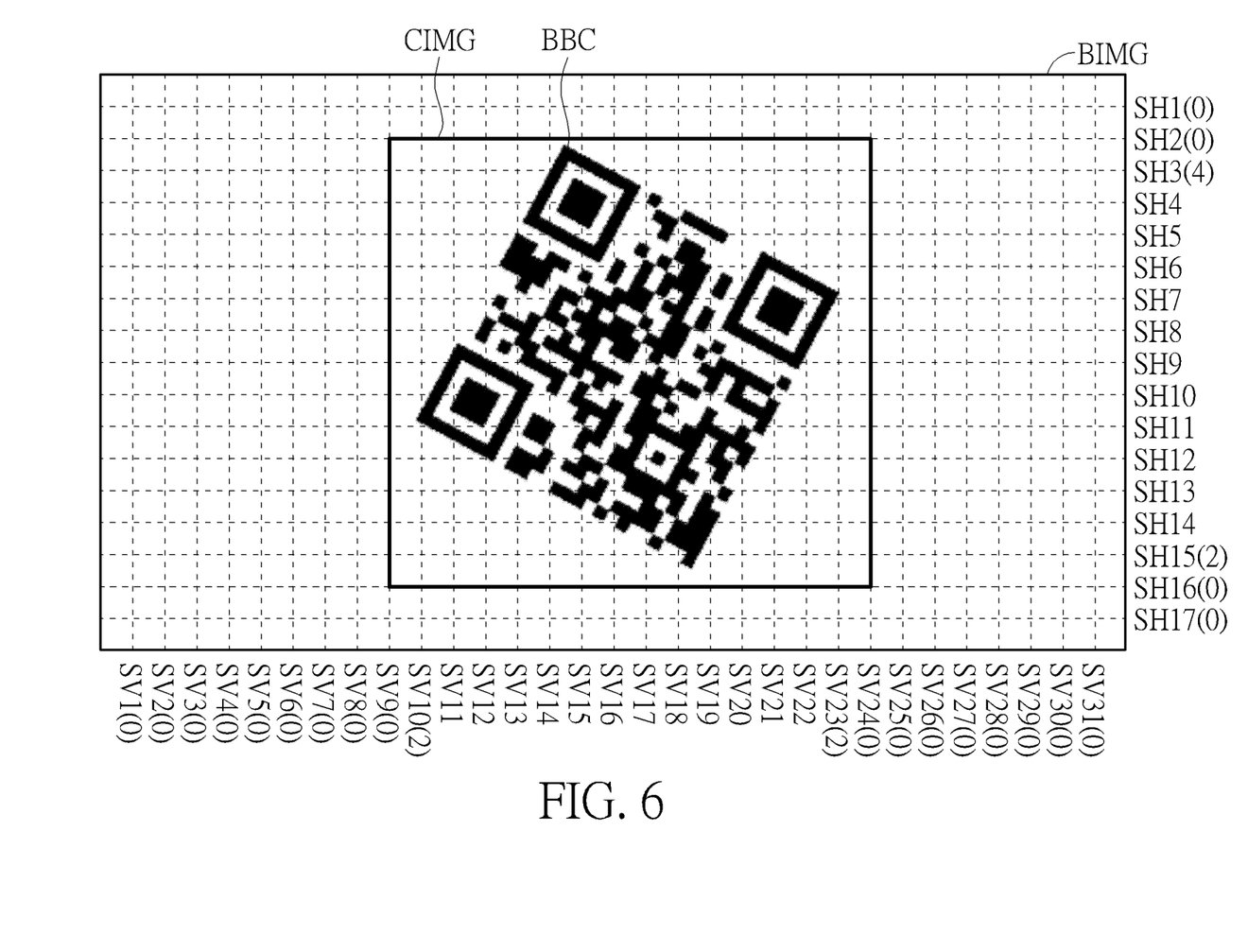
FIG. 6 is an illustration of locating an image region according to the plurality of gray level flip counts in the vertical direction and the plurality of gray level flip counts in the horizontal direction of the barcode detection system in FIG. 1.

FIG. 6 is an illustration of locating an image region CIMG according to the plurality of gray level flip counts in the vertical direction and the plurality of gray level flip counts in the horizontal direction of the barcode detection system 100. As previously mentioned, the interval-based sampling mechanism for acquiring V gray level flip counts of the binarized image BIMG in the vertical direction and H gray level flip counts of the binarized image BIMG in the horizontal direction is introduced. When a gray level flip count corresponding to a scan line is equal to zero, it implies that pixels with a single color are sampled by the scan line. Therefore, the scan line is located outside a region of the barcode. In the barcode detection system 100, a vertical numerical interval can be generated according to the V gray level flip counts. Gray level flip counts of the vertical numerical interval are greater than zero. For example, gray level flip counts of the vertical scan lines SV10 and SV23 are greater than zero. Thus, it implies that all (or say "almost") gray level flip counts between the vertical scan lines SV10 and SV23 are greater than zero. Thus, an interval between the vertical scan lines SV10 and SV23 can correspond to an interval of a barcode image on X-axis. Further, the barcode detection system 100 can slightly extend the interval between the vertical scan lines SV10 and SV23 in order to ensure that the barcode image can be entirely covered. Finally, the barcode detection system 100 can use an interval between the vertical scan lines SV9 and SV24 as the X-axis interval of the image region CIMG for locating the barcode (the binarized barcode BBC). However, the barcode detection system 100 can directly use the interval between the vertical scan lines SV10 and SV23 as the X-axis interval of the image region CIMG for locating the barcode (the binarized barcode BBC). Similarly, a horizontal numerical interval can be generated according to the H gray level flip counts. Gray level flip counts of the horizontal numerical interval are greater than zero. For example, gray level flip counts of the horizontal scan lines SH3 and SH15 are greater than zero. Thus, it implies that all (or say "almost") gray level flip counts between the horizontal scan lines SH3 and SH15 are greater than zero. Thus, an interval between the horizontal scan lines SH3 and SH15 can correspond to an interval of the barcode image on Y-axis. Further, the barcode detection system 100 can slightly extend the interval between the horizontal scan lines SH3 and SH15 in order to ensure that the barcode image can be entirely covered. Finally, the barcode detection system 100 can use an interval between the horizontal scan lines SH2 and SH16 as the Y-axis interval of the image region CIMG for locating the barcode (the binarized barcode BBC). However, the barcode detection system 100 can directly use the interval between the horizontal scan lines SH3 and SH15 as the Y-axis interval of the image region CIMG for locating the barcode (the binarized barcode BBC). In other words, the barcode detection system 100 can locate the image region CIMG of the barcode according to positions of the vertical numerical interval and the horizontal numerical interval.

Figure 7:
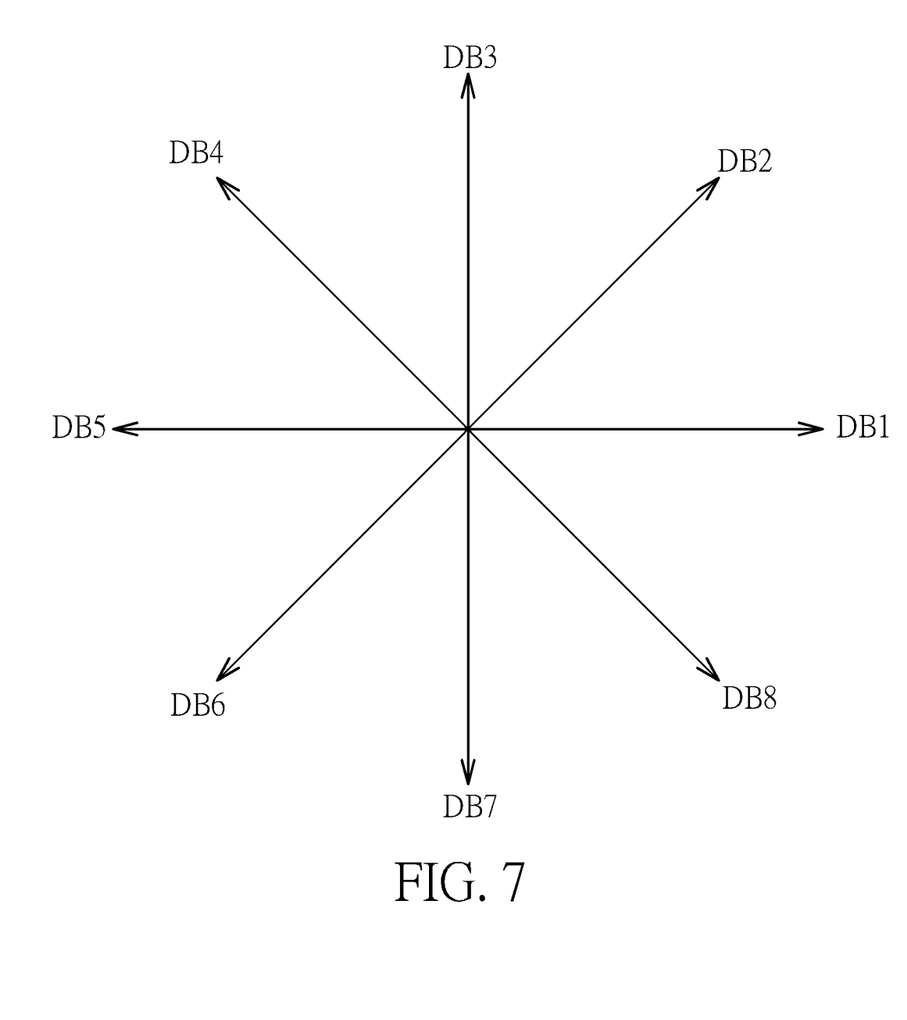
FIG. 7 is an illustration of setting P gradient phase decision boundaries of the barcode detection system in FIG. 1.

FIG. 7 is an illustration of setting P gradient phase decision boundaries of the barcode detection system 100. In the barcode detection system 100, the P gradient phase decision boundaries can be predetermined. Two adjacent phase decision boundaries are separated by $2\pi/P$. For example, when P is equal to eight, eight phase decision boundaries are generated by the barcode detection system 100, which are denoted as DB1 to DB8. Here, the phase decision boundary DB1 corresponds to a phase equal to zero. The phase decision boundary DB2 corresponds to a phase equal to $2\pi/8$. The phase decision boundary DB3 corresponds to a phase equal to $4\pi/8$, and so on. As previously mentioned, the processor 11 can generate the gradient phase of the each pixel of the image IMG. Further, the processor 11 can generate the image region CIMG for locating the barcode. Therefore, the processor 11 can generate a plurality of decision gradient phases from the gradient phases of all pixels within the image region CIMG by using the P gradient phase decision boundaries. In other words, each gradient phase within the image region CIMG can be quantized as one gradient phase decision boundary of the P gradient phase decision boundaries. Therefore, the decision gradient phases generated by the processor 11 have P possible phase patterns (i.e., P deterministic phases). Here, since each included angle between two edges at a turning point for the two-dimensional barcode is equal to $\pi/2$, P is an even integer greater than four. By doing so, gradient phase characteristics of the two-dimensional barcode within the image region CIMG can be quantized.

Figure 8:
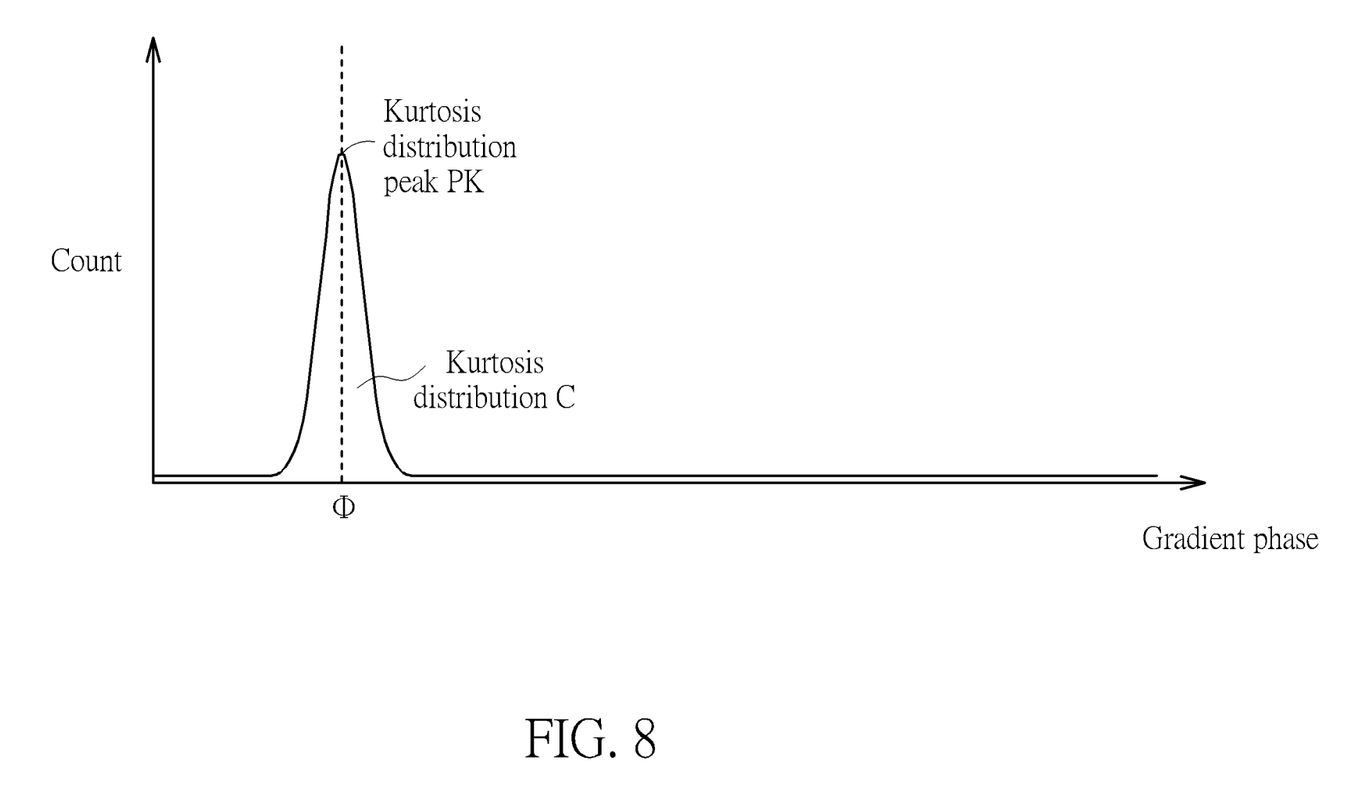
FIG. 8 is an illustration of a gradient phase distribution with only one kurtosis distribution of the barcode detection system in FIG. 1.

FIG. 8 is an illustration of a gradient phase distribution with only one kurtosis distribution C of the barcode detection system 100. As previously mentioned, the processor 11 can generate the plurality of decision gradient phases from the gradient phases of all pixels within the image region CIMG by using the P gradient phase decision boundaries. Then, the processor 11 can generate the gradient phase distribution according to the plurality of decision gradient phases. In other words, the processor 11 can perform a statistical analysis process to the plurality of decision gradient phases (i.e., P possible phase patterns) of all pixels within the image region CIMG. For example, the number of decision gradient phases equal to zero (i.e., corresponding to the gradient phase decision boundary DB1) can be counted by the processor 11 according to the plurality of decision gradient phases of all pixels within the image region CIMG. Similarly, the number of decision gradient phases equal to $2\pi/8$ (i.e., corresponding to the gradient phase decision boundary DB2) can be counted by the processor 11 according to the plurality of decision gradient phases of all pixels within the image region CIMG, and so on. Finally, the gradient phase distribution can be generated by the processor 11, as shown in FIG. 8. Specifically, the processor 11 can generate the barcode format detection result as a one-dimensional barcode format when the gradient phase distribution has only one kurtosis distribution C, as illustrated below. Since the one-dimensional barcode includes a plurality of bars (with black color) and spaces (with white color) in a single axis, a gradient phase of each pixel of the image corresponds to a single angle. When the image of the one-dimensional barcode is not rotated, the gradient phase of the each pixel corresponds to $\pi/2$. However, in a general case of the image of the one-dimensional barcode being captured by the camera 10, the image may be rotated. When the image of the one-dimensional barcode is rotated, the gradient phase of the each pixel corresponds to $\pi/2+\theta$. $\theta$ is denoted as a rotation phase offset. Therefore, in FIG. 8, when the gradient phase distribution has only one kurtosis distribution C and a phase corresponding to kurtosis distribution peak PK is substantially equal to $\Phi$, the barcode can be detected as the one-dimensional barcode by the processor 11. The rotation phase offset $\theta$ can be derived as $\Phi-\pi/2$.

Figure 9:
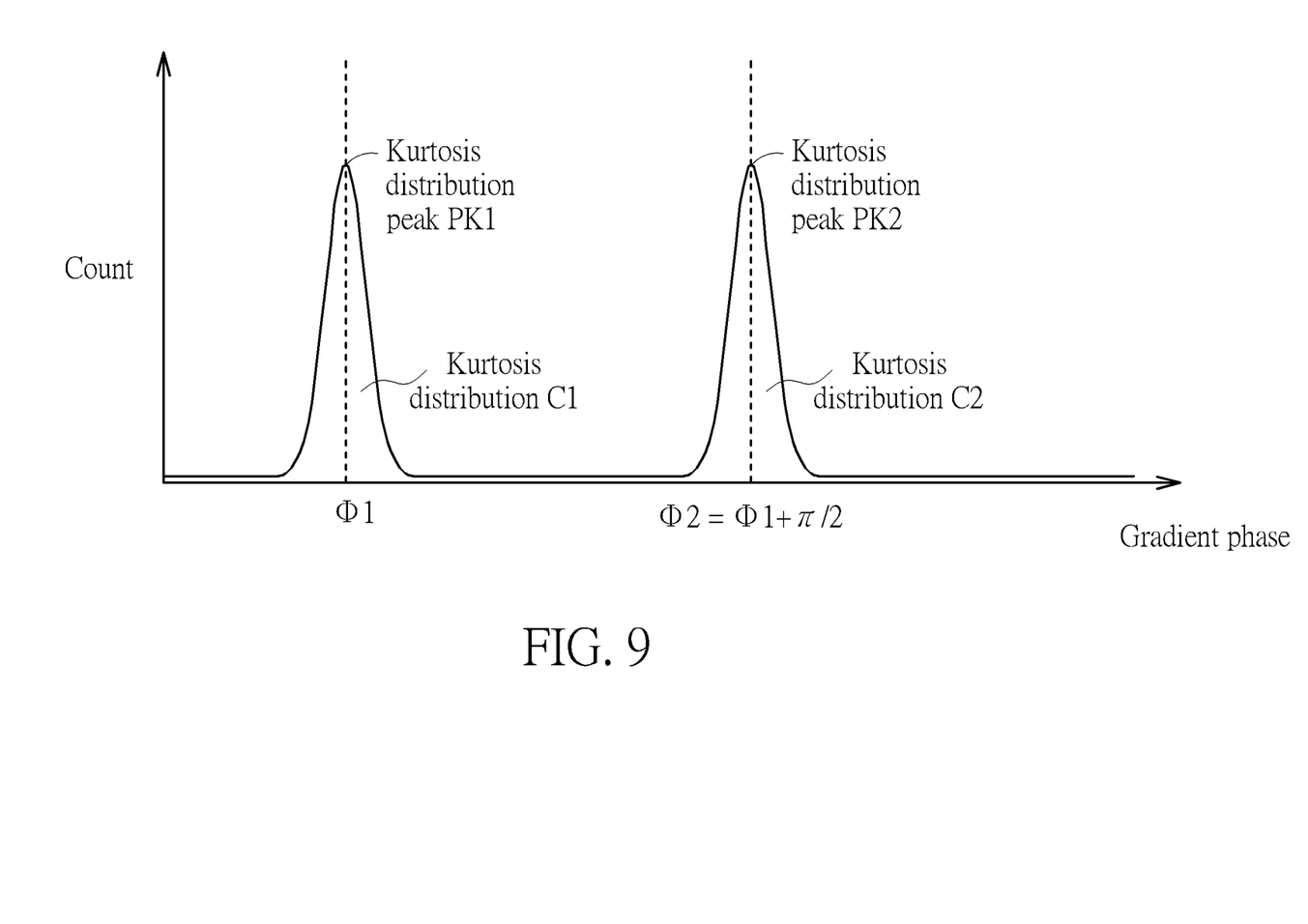
FIG. 9 is an illustration of a gradient phase distribution with two kurtosis distributions of the barcode detection system in FIG. 1.

FIG. 9 is an illustration of a gradient phase distribution with two kurtosis distributions C1 and C2 of the barcode detection system 100. As previously mentioned, the processor 11 can generate the plurality of decision gradient phases from the gradient phases of all pixels within the image region CIMG by using the P gradient phase decision boundaries. Then, the processor 11 can generate the gradient phase distribution according to the plurality of decision gradient phases. In other words, the processor 11 can perform the statistical analysis process to the plurality of decision gradient phases (i.e., P possible phase patterns) of all pixels within the image region CIMG. For example, the number of decision gradient phases equal to zero (i.e., corresponding to the gradient phase decision boundary DB1) can be counted by the processor 11 according to the plurality of decision gradient phases of all pixels within the image region CIMG. Similarly, the number of decision gradient phases equal to $2\pi/8$ (i.e., corresponding to the gradient phase decision boundary DB2) can be counted by the processor 11 according to the plurality of decision gradient phases of all pixels within the image region CIMG, and so on. Finally, the gradient phase distribution can be generated by the processor 11, as shown in FIG. 9. Specifically, the processor 11 can generate the barcode format detection result as a two-dimensional barcode format when the gradient phase distribution has two kurtosis distributions C1 and C2, and two phases corresponding to two kurtosis distribution peaks PK1 and PK2 are separated by $\pi/2$, as illustrated below. Since the two-dimensional barcode includes a plurality of black segments and white segments in two perpendicular axes, gradient phases of the image correspond to dual angles. When the image of the two-dimensional barcode is not rotated, a gradient phase of each pixel corresponds to 0 or π/2. However, in a general case of the image of the two-dimensional barcode being captured by the camera 10, the image may be rotated. When the image of the two-dimensional barcode is rotated, the gradient phase of the each pixel corresponds to θ or π/2+θ. θ is denoted as a rotation phase offset. Therefore, in FIG. 9, when the gradient phase distribution has two kurtosis distributions C1 and C2, two kurtosis distribution peaks PK1 and PK2 can be respectively detected to indicate two phases Φ1 and Φ2. When Φ1 and Φ2 are separated by π/2, the barcode can be detected as the two-dimensional barcode by the processor 11. The rotation phase offset θ can be derived as Φ1.

FIG. 8 and FIG. 9 are two illustrations for presenting two different gradient phase distributions in the embodiment. However, gradient phase distributions in FIG. 8 and FIG. 9 can be generated by any reasonable method. For example, when the P gradient phase decision boundaries are introduced to the barcode detection system 100, the gradient phase distribution can be a discrete distribution. Further, the barcode detection system 100 can use an interpolation algorithm for smoothing a curve of the gradient phase distribution. Any reasonable technology modification falls into the scope of the present invention.

Figure 10:
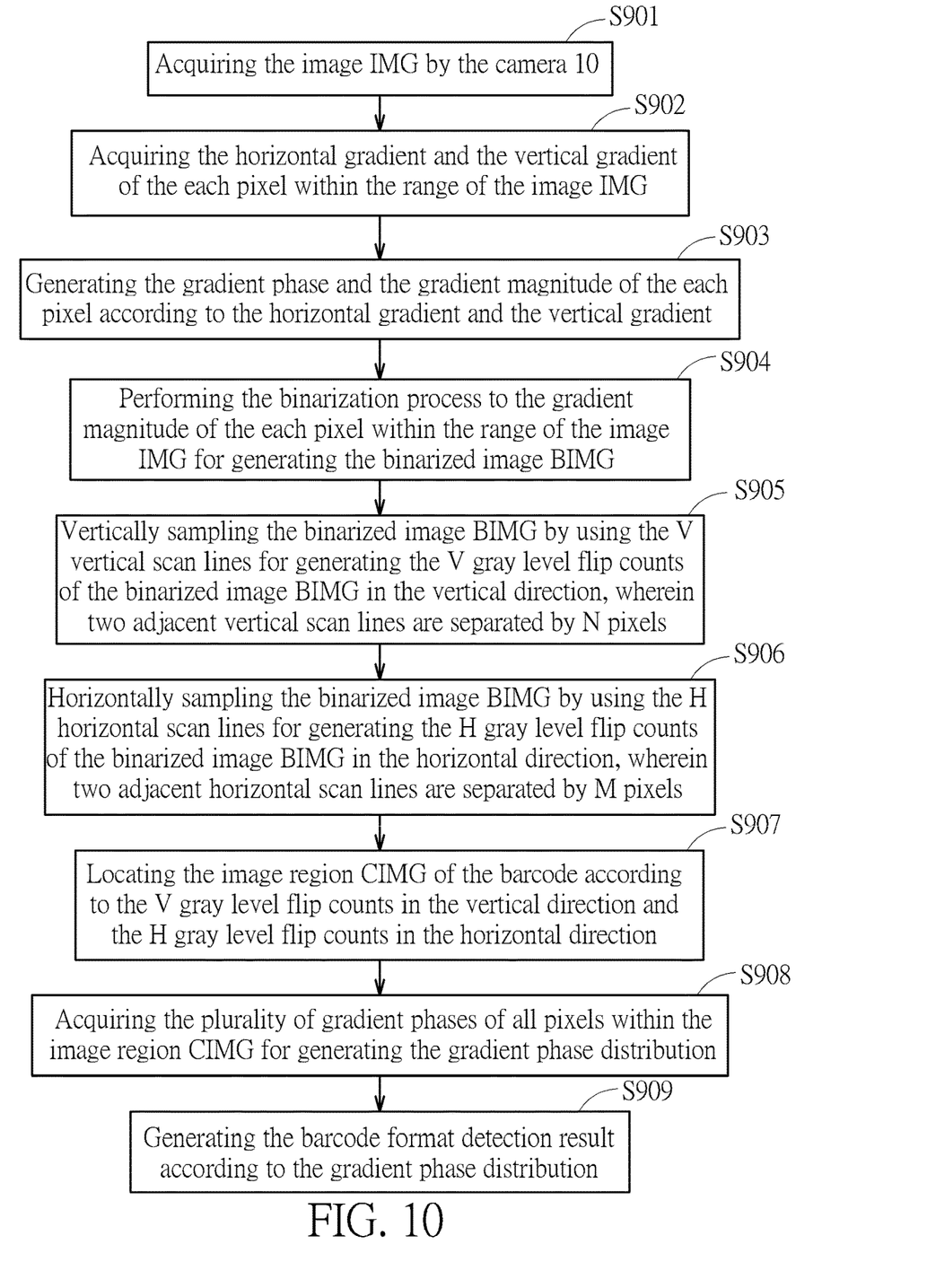
FIG. 10 is a flow chart of a barcode detection method performed by the barcode detection system in FIG. 1.

FIG. 10 is a flow chart of a barcode detection method performed by the barcode detection system 100. The barcode detection method includes step S901 to step S909. Any reasonable modification of step S901 to step S909 falls into the scope of the present invention. Step S901 to step S909 are illustrated below.

step S901: acquiring the image IMG by the camera 10;
step S902: acquiring the horizontal gradient and the vertical gradient of the each pixel within the range of the image IMG;
step S903: generating the gradient phase and the gradient magnitude of the each pixel according to the horizontal gradient and the vertical gradient;
step S904: performing the binarization process to the gradient magnitude of the each pixel within the range of the image IMG for generating the binarized image BIMG;
step S905: vertically sampling the binarized image BIMG by using the V vertical scan lines for generating the V gray level flip counts of the binarized image BIMG in the vertical direction, wherein two adjacent vertical scan lines are separated by N pixels;
step S906: horizontally sampling the binarized image BIMG by using the H horizontal scan lines for generating the H gray level flip counts of the binarized image BIMG in the horizontal direction, wherein two adjacent horizontal scan lines are separated by M pixels;
step S907: locating the image region CIMG of the barcode according to the V gray level flip counts in the vertical direction and the H gray level flip counts in the horizontal direction;
step S908: acquiring the plurality of gradient phases of all pixels within the image region CIMG for generating the gradient phase distribution;
step S909: generating the barcode format detection result according to the gradient phase distribution.

Step S901 to step S909 are illustrated previously. Thus, illustrations of step S901 to step S909 are omitted here. However, technologies of step S901 to step S909 can be reasonably modified. For example, in step S907, when the V gray level flip counts in the vertical direction and the H gray level flip counts in the horizontal direction are equal to zero, it implies that the barcode information is absent in the image captured by the camera 10. Then, the processor can generate a message as "barcode undetected" for notifying a user and proceed to detect a next image frame. For example, in step S907, after the processor 11 locates the image region CIMG of the barcode, the image region CIMG of the image IMG can be further enlarged for increasing decoding reliability. Also, in step S909, when the gradient phase distribution has two kurtosis distributions and two phases corresponding to two kurtosis distribution peaks are separated by a very large value or a very small value (i.e., Φ2−Φ1>>π/2 or Φ2−Φ1<<π/2), the processor 11 can generate a message as "abnormal barcode detection" for notifying the user. By using step S901 to step S909, the presence of the barcode and the format of the barcode can be detected by using the barcode detection system 100 with low computational complexity and processing time.

To sum up, the present invention discloses a barcode detection method and a barcode detection system. The barcode detection system can acquire the image by using the camera. The barcode detection system can acquire a horizontal gradient and a vertical gradient of each pixel within a specific small range or a full size range of the image for generating a gradient phase and a gradient magnitude of the each pixel. In order to improve detection accuracy, the binarization process can be applied to the image by the processor. Then, the interval-based sampling mechanism for detecting color characteristics of the binarized image can be introduced to the barcode detection system for reducing computational complexity and processing time. Then, the processor can locate the image region of the barcode for generating the gradient phase distribution. Finally, the processor can generate the barcode format detection result according to the gradient phase distribution. Therefore, the barcode detection method and the barcode detection system can provide high detection reliability in conjunction with low computational complexity and processing time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A barcode detection method comprising:
acquiring an image by a camera;
acquiring a horizontal gradient and a vertical gradient of each pixel within a range of the image;
generating a gradient phase and a gradient magnitude of the each pixel according to the horizontal gradient and the vertical gradient;
performing a binarization process to the gradient magnitude of the each pixel within the range of the image for generating a binarized image;
vertically sampling the binarized image by using V vertical scan lines for generating V gray level flip counts of the binarized image in a vertical direction;
horizontally sampling the binarized image by using H horizontal scan lines for generating H gray level flip counts of the binarized image in a horizontal direction;
locating an image region of a barcode according to the V gray level flip counts in the vertical direction and the H gray level flip counts in the horizontal direction;
acquiring a plurality of gradient phases of all pixels within the image region for generating a gradient phase distribution; and generating a barcode format detection result according to the gradient phase distribution;
wherein two adjacent vertical scan lines are separated by N pixels, two adjacent horizontal scan lines are separated by M pixels, and N, M, V and H are four positive integers greater than or equal to one.

2. The method of claim 1, wherein acquiring the horizontal gradient and the vertical gradient of the each pixel within the range of the image, is acquiring the horizontal gradient and the vertical gradient of the each pixel within the range of the image according to convolution results of a horizontal edge detection filter, a vertical edge detection filter, and brightness of the each pixel within the range of the image.

3. The method of claim 1, wherein performing the binarization process to the gradient magnitude of the each pixel within the range of the image for generating the binarized image comprises:
setting a threshold value; and
comparing the threshold value with the gradient magnitude for mapping the gradient magnitude to a first gray level or a second gray level;
wherein the first gray level is greater than the second gray level.

4. The method of claim 3, wherein the V gray level flip counts of the binarized image in the vertical direction are V gray level flip counts switched between the first gray level and the second gray level in the vertical direction sampled by the V vertical scan lines.

5. The method of claim 3, wherein the H gray level flip counts of the binarized image in the horizontal direction are H gray level flip counts switched between the first gray level and the second gray level in the horizontal direction sampled by the H horizontal scan lines.

6. The method of claim 1, wherein locating the image region of the barcode according to the V gray level flip counts in the vertical direction and the H gray level flip counts in the horizontal direction comprises:
generating a vertical numerical interval according to the V gray level flip counts, wherein gray level flip counts of the vertical numerical interval are greater than zero;
generating a horizontal numerical interval according to the H gray level flip counts, wherein gray level flip counts of the horizontal numerical interval are greater than zero; and
locating the image region of the barcode according to positions of the vertical numerical interval and the horizontal numerical interval.

7. The method of claim 1, further comprising:
setting P gradient phase decision boundaries, wherein two adjacent phase decision boundaries are separated by $2\pi/P$;
generating a plurality of decision gradient phases from the gradient phases of all pixels within the image region by using the P gradient phase decision boundaries; and
generating the gradient phase distribution according to the plurality of decision gradient phases;
wherein P is an even integer greater than four.

8. The method of claim 1, wherein generating the barcode format detection result according to the gradient phase distribution comprises:
generating the barcode format detection result as a one-dimensional barcode format when the gradient phase distribution has only one kurtosis distribution.

9. The method of claim 1, wherein generating the barcode format detection result according to the gradient phase distribution comprises:
generating the barcode format detection result as a two-dimensional barcode format when the gradient phase distribution has two kurtosis distributions and two phases corresponding to two kurtosis distribution peaks are separated by $\pi/2$.

10. A barcode detection system comprising:
a camera configured to capture an image;
a processor coupled to the camera and configured to process the image in order to generate a barcode format detection result; and
a memory coupled to the processor and configured to buffer image processing data;
wherein the processor acquires a horizontal gradient and a vertical gradient of each pixel within a range of the image, generates a gradient phase and a gradient magnitude of the each pixel according to the horizontal gradient and the vertical gradient, performs a binarization process to the gradient magnitude of the each pixel within the range of the image for generating a binarized image, vertically samples the binarized image by using V vertical scan lines for generating V gray level flip counts of the binarized image in a vertical direction, saves the V gray level flip counts to the memory, horizontally samples the binarized image by using H horizontal scan lines for generating H gray level flip counts of the binarized image in a horizontal direction, saves the H gray level flip counts to the memory, locates an image region of a barcode according to the V gray level flip counts and the H gray level flip counts saved in the memory, acquires a plurality of gradient phases of all pixels within the image region for generating a gradient phase distribution, and generates the barcode format detection result according to the gradient phase distribution, two adjacent vertical scan lines are separated by N pixels, two adjacent horizontal scan lines are separated by M pixels, and N, M, V and H are four positive integers greater than or equal to one.

* * * * *